Dec. 1, 1931.　　　C. J. FECHHEIMER　　　1,834,392
MEASURING DEVICE
Filed Sept. 8, 1925
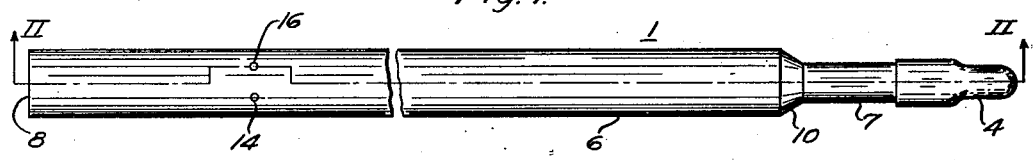
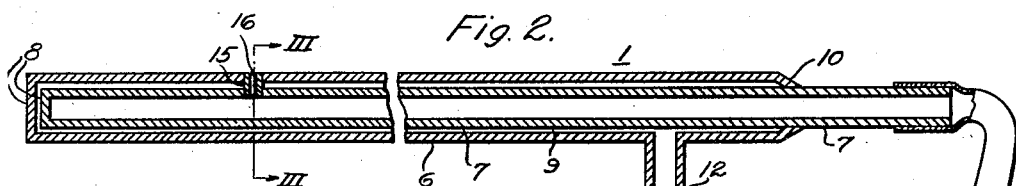
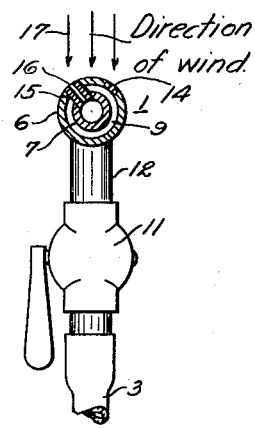
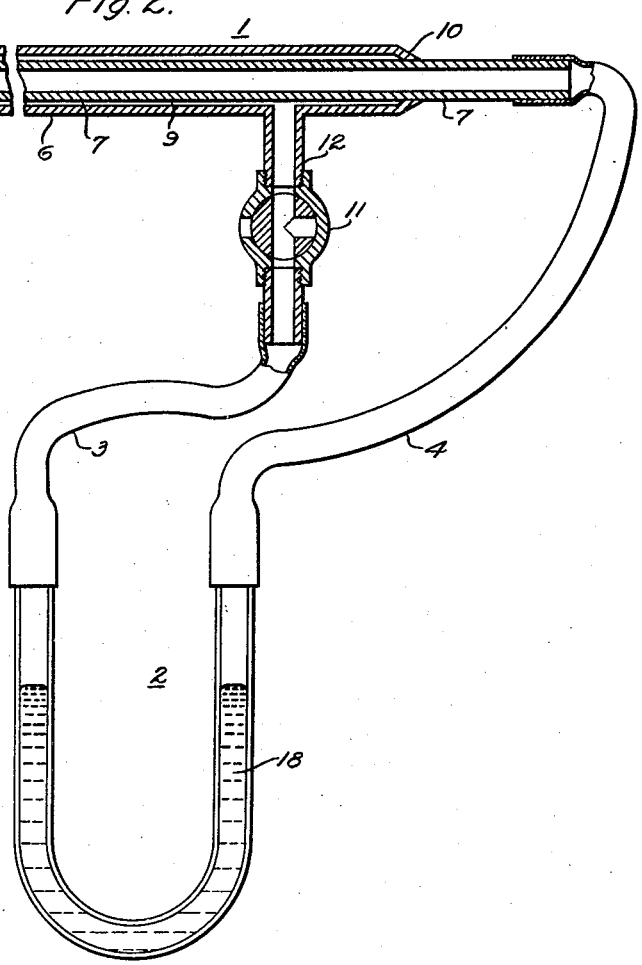
WITNESSES:
INVENTOR
Carl J. Fechheimer.
BY
Wesley G. Carr
ATTORNEY Patented Dec. 1, 1931

1,834,392

UNITED STATES PATENT OFFICE

CARL J. FECHHEIMER, OF PITTSBURGH, PENNSYLVANIA, ASSIGNOR TO WESTINGHOUSE ELECTRIC & MANUFACTURING COMPANY, A CORPORATION OF PENNSYLVANIA

MEASURING DEVICE

Application filed September 8, 1925. Serial No. 54,886.

My invention relates to measuring devices and particularly to devices for measuring static pressures in spaces containing flowing fluids.

One object of my invention is to provide a device of the above-indicated character that shall be simple and durable in construction and effective in its operation.

Another object of my invention is to provide a device that shall so nullify the effect of a flowing fluid as to obtain a very accurate measurement of the static pressure in a space containing the flowing fluid.

In static pressure measuring devices as heretofore suggested, various errors in the reading of static pressure have been introduced, the velocity head or a fraction thereof being added to or subtracted from the static pressure, and, to the best of my knowledge, no device of this character has operated to a satisfactory degree of accuracy.

In bulletin No. 394, issued by the Bureau of Standards and entitled "Air forces on circular cylinders", it is shown that the angle between the direction of the wind and the position on the cylinder's surface where the velocity head's influence is negligible, is quite clearly defined and is about 40°.

Accordingly, in practicing my invention, I utilize the above-disclosed phenomenon by providing a device embodying a cylindrical member having two openings disposed approximately 40° on opposite sides of a point on the surface of the cylinder, a line between said openings to be placed normal to the direction of the wind stream, and internal chambers that are so related to said openings and to an indicating element as to permit the taking of very accurate measurements of the static pressures in draught-traversed spaces.

Figure 1 of the accompanying drawings is a plan view on a somewhat enlarged scale of a part of a measuring device constructed in accordance with my invention, Fig. 2 is a view partially in section taken along the line II—II of Fig. 1 and partially in elevation of the device including the manometer and its connections, and Fig. 3 is a view taken along the line III—III of Fig. 2.

In its simplest and preferred form, the device comprises in general, a pressure-chamber structure 1, a U-tube or manometer 2 and means 3 and 4 such as flexible rubber tubing for connecting the pressure chamber structure 1 to the manometer 2.

The pressure chamber structure 1 comprises concentrically disposed tubes 6 and 7 that are each closed at one end as by discoidal end portions 8. A space 9 between the members 6 and 7 is closed, as by an annular member or ring 10, at the other end of the member 6 which may be an integral depressed or crimped portion of the member 6, as shown.

The tubular member 3 connects one leg of the manometer 2 to the space 9 between the tubes 6 and 7 in the structure 1, through a valve 11 and a tubular projection 12 on the outer member 6, and the tubular member 4 connects the other leg of the manometer to the interior of the inner tube 7 of the structure 1.

The outer tubular member 6 is provided at an intermediate position thereon with an opening 14 which provides communication between the space 9 and the exterior of the structure 1. A relatively small tubular member 15 is sealed between diametrically opposite openings, in the members 6 and 7 to provide an opening 16 from the exterior of the structure 1 to the interior of the member 7, that is angularly or circumferentially related to the opening 14 at a predetermined distance therefrom, this distance, as hereinbefore mentioned, is approximately 80°, or twice the distance of one of the openings from the longitudinal axis of the wind stream at which the velocity head's influence is negligible. I have found 78½° to be an effective working distance between these openings.

In operation, the structure 1 is placed in a duct or other space containing a flowing fluid, as represented by arrows 17 in Fig. 3, and turned about its longitudinal axis until a point midway between the openings 14 and 16 is disposed on the longitudinal axis of the flowing stream, represented by the central arrow 17, or, in other words, until the levels of a liquid body 18 in the manometer 2 are balanced. This condition indicates that the effect of the kinetic pressure of the flowing fluid has been nullified by the angular arrangement of the differentially opposed openings 14 and 16 and their relation to the flowing fluid. After this adjustment has been made, one of the legs of the manometer 2 may be opened to the atmosphere as by removing one end of one of the flexible tubes 3 or 4, or by manipulating the valve 11. Opening of one of the legs of the manometer 2 to the atmosphere causes the liquid in the manometer to assume new levels in accordance with the static pressure in the duct or space in which the structure 1 is disposed.

It will be apparent to those skilled in the art that a sphere may be used in lieu of the cylinder 6 and that two manometer tubes may be substituted for one manometer tube and the valve, without departing from the spirit and scope of my invention, as set forth in the appended claims.

I claim as my invention:—

1. A device for measuring the static pressure head in a moving fluid comprising two concentric cylinders providing a chamber therebetween and the outer cylinder having two small openings therethrough spaced circumferentially by an angle substantially equal to double the angle from the direction of stream flow to that position on said surface at which the influence of the velocity head is negligible, means providing a passageway between the chamber constituted by the space within the inner cylinder and one of said openings, a manometer, and means for connecting the two chambers to the terminals of the manometer, the manometer being adapted to be balanced by rotation of the cylinders about the axis of symmetry thereof, one side of the manometer being adapted for communication with the atmosphere to measure the static pressure after the manometer has been balanced.

2. A device for measuring the static pressure head in a moving fluid comprising a cylindrical structure providing chambers communicating, respectively, with small openings in the outer surface of the structure and spaced circumferentially about the cylinder by an angle substantially equally to double the angle from the direction of stream flow to that position on said surface at which the influence of the velocity head is negligible, and means in communication with the chambers and responsive to differential pressures therein, said pressures to be adjusted until they are substantially equal by rotation of said structure about its longitudinal axis and the static pressure to be measured by relieving the pressure at one side of said differential-pressure-responsive means.

3. A device comprising a structure having an outer surface of circular cross-sectional contour about an axis for position at substantially right-angles to a fluid stream and relatively small outer-surface openings circumferentially spaced thereabout by an angle substantially equal to double the angle from the direction of stream flow to that position on said surface at which the influence of the velocity head is negligible, said structure providing separate chambers severally communicating with one of said openings and adapted for communication with a device responsive to differential pressures in said chambers.

In testimony whereof, I have hereunto subscribed my name this 20th day of August, 1925.

CARL J. FECHHEIMER.